March 24, 1953
E. M. GILES
2,632,408
COMPARTMENTIZABLE SEAT FOR RAILROAD
COACHES AND THE LIKE
Filed Oct. 4, 1951
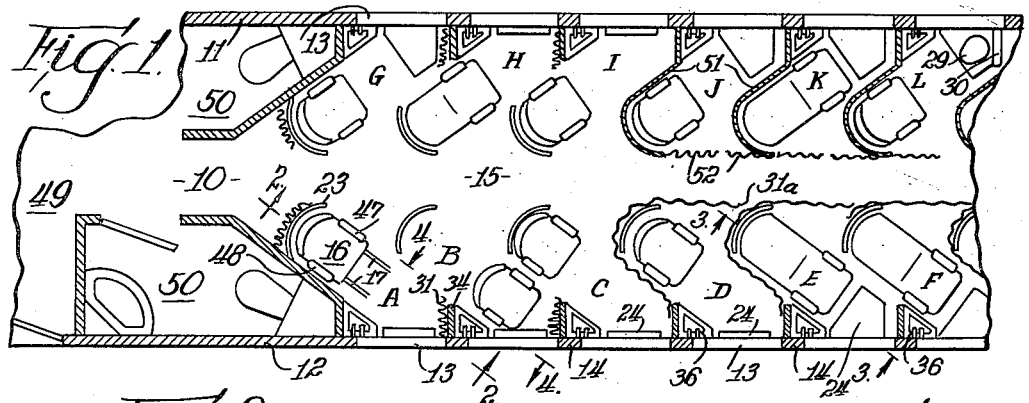
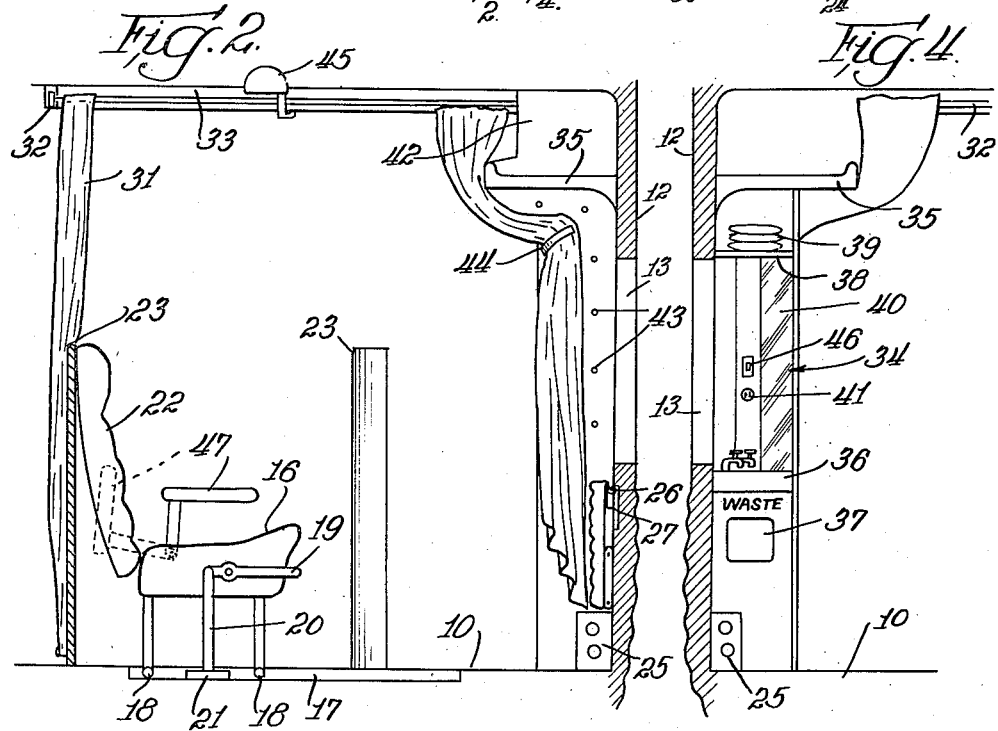
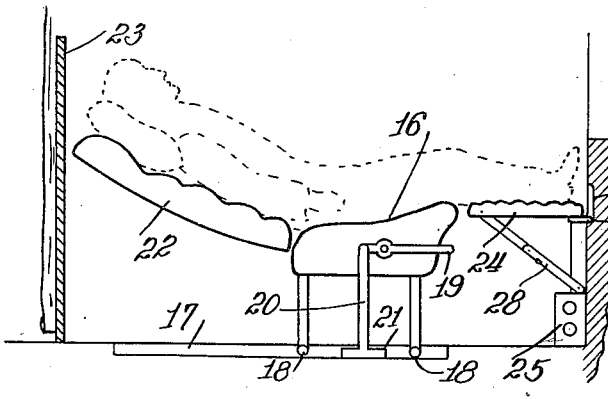
Inventor:
E. Manning Giles Patented Mar. 24, 1953

2,632,408

UNITED STATES PATENT OFFICE 2,632,408

COMPARTMENTIZABLE SEAT FOR RAILROAD COACHES AND THE LIKE

Eugene Manning Giles, Western Springs, Ill.

Application October 4, 1951, Serial No. 249,700

14 Claims. (Cl. 105—344)

My invention relates to enclosable seating facilities for railroad passenger coaches and the like and has reference more particularly to an improved arrangement of individualized seats disposed obliquely between the center aisle and the side wall of the coach which provide ample reclining space for each passenger and which may be enclosed to constitute a private compartment-like space without appreciable reduction in seating capacity.

The railroads derive a substantial proportion of their passenger revenue from coach fares which, though considerably lower per passenger, often total as much or more per car than the fares obtained from Pullman cars owing to the greater number of passengers that may be carried in a coach.

The economy of coach travel is an important factor in attracting to the railroads passengers who might otherwise travel by other low cost modes of transportation. Hence the railroads are concerned with enhancing the attractiveness of coach travel without unduly limiting the passenger capacity per coach which must, of course, be maintained to make the lower fares possible.

The railroads have made great strides in improving their passenger coaches, but there are still certain discomforts and inconveniences associated with overnight and long distance coach travel which have not heretofore been overcome, even in the newest and most luxuriously appointed coaches. Up to this time, coach passengers have not been afforded any privacy and they have not been able to stretch out sufficiently for restful, comfortable sleep at night.

The principal objects of my invention are to devise a passenger coach arrangement in which each passenger is afforded a fully individualized, reclinable seat; to arrange such seats so that in reclining position, the occupant can stretch out virtually full length; to enable each passenger to pair his seat with either of the adjacent seats on the same side of the aisle when he desires; to permit complete enclosure of each seat space when it is desired to have full privacy; to enable enclosure of two or more adjoining seat spaces as a unit in the case of persons traveling together; to make each seat a preferred type "window seat" with unobscured view, yet affording direct access to the center aisle; to insure maximum comfort and convenience both for daytime and nighttime travel; to furnish each passenger with his own wash stand; to design a flexible seating arrangement readily adaptable to dome cars and double deck arrangements, yet capable of modification to permit installation of berths; and to achieve these and other objects without appreciably limiting the passenger capacity per car, these and other objects being accomplished as hereinafter described, reference being had to the accompanying drawing in which:

Fig. 1 is a plan view of a portion of the length of a railroad passenger coach equipped with my improved seating facilities, and having curtain means for enclosing some of the seats and permanent partitions separating other seats;

Fig. 2 is an enlarged sectional view on the line 2—2 of Fig. 1 showing a seat with the back portion thereof in upright position;

Fig. 3 is an enlarged sectional view on the line 3—3 of Fig. 1 showing a seat with the back portion thereof in full reclining position; and Fig. 4 is an enlarged sectional view on the line 4—4 of Fig. 1.

Referring to the drawing in which I have illustrated my invention as applied to a railroad coach, the reference numeral 10 indicates the floor of the coach and 11 and 12 the opposite side walls respectively thereof, each of which has conventional windows 13 therealong elevated as usual above the floor 10 and separated by the customary mullions 14, these windows being of suitable width and spaced apart to provide an individual window for each seating space or compartment area as hereinafter more fully explained.

As is customary, an aisle 15 is provided which extends lengthwise of the coach and at the opposite sides of which my improved seating facilities are located, and at its ends the coach may be provided with any desired washroom, vestibule, and entrance doorway arrangement.

Generally, such coaches are provided at each side of the aisle with a series of double occupancy seats each directly ahead of the other and arranged at right angles to the car sides so that the occupants of the seats face toward the end of the coach. However, in accordance with my invention, a series of single occupancy seats is provided at each side of the aisle 15 and each seat faces obliquely toward the respective side wall at an angle of approximately 35 degrees so that each seat occupies an individual oblique space of seat width and of such overall length from the aisle 15 to the respective side walls 11 or 12 that it will accommodate the occupant of the seat in reclining, outstretched position. The windows 13 are so arranged that there is an individual window at the outer end of each said individualized oblique seating space. For convenience, the oblique seating spaces shown in the drawing are indicated respectively and distinguished from one another by the letters A, B, C, D, E, F, G, H, I, J, K, and L.

These obliquely arranged seats are indicated as a whole each by the reference numeral 16 and for reasons hereinafter explained each seat is movably supported for convenient movement lengthwise in the individual oblique space which it occupies, from a position directly alongside the aisle 15 to a position close to the respective side wall 11 or 12.

Any convenient means may be provided to afford such movement of the seats 16, as for example the floor 10 may be provided within each seat space with a pair of parallel recessed guideways 17 extending lengthwise and arranged respectively at or near the opposite sides of said oblique seat space, and the understructure of the seat 16 has rollers 18 located in and movable along these guideways 17 to afford the required adjustment of the seat 16 lengthwise of the oblique space.

Preferably, facilities are provided for holding the seat against movement in any position of adjustment along the guideways 17 and any convenient facilities may be employed for this purpose. As an example thereof, each seat may have a lever 19 pivoted to the side thereof and having a depending link 20 with a brake shoe 21 at the lower end which in the normal horizontal position of the lever 19 is free of brake contact with the guideway 17, but is frictionally engaged thereagainst when the lever 19 is lifted to the upright position. It will be understood, of course, that the guideway and braking facilities as described are examples of those which may be employed. Other examples are in common use as mountings for automobile front seats enabling such seats to be moved forward or backward and held firmly in the desired location in the same manner as contemplated in my invention.

Each seat 16 is of the reclining type and has a back 22 which is normally in upright position as shown in Fig. 2, but which is adjustable to a comfortable reclining position as shown in Fig. 3 and to various intermediate positions. Such reclining seats are well known and the details of construction thereof are not shown inasmuch as the particular type of reclining seat forms no part of the present invention.

The guideways 17 are of sufficient length so that the seat 16 is movable outwardly from the aisle 15 toward the car sidewall end of the respective oblique seating space so that when thus moved away from the aisle 15, the seat back 22 may be lowered into the full reclining position shown in Fig. 3 without projecting out into the aisle 15. It is preferred that said reclinable seat back 22 be so arranged that it cannot be adjusted to a reclining position when the seat 16 is at the aisle end of the oblique seating space. For this purpose, a low arcuate wall or guard 23 of approximately seat back height may be provided at the aisle end of the seating space. Such a guard 23 requires that the seat 16 be moved sufficiently outwardly from the aisle 15 for any desired reclining position of said seat 16 so that the seat back 22 in such position will not protrude into the aisle 15. Moreover, the guard 23 serves the added purpose of shielding or protecting the head of the seat occupant from being bumped accidentally by persons moving through the aisle 15 when the seat back 22 is in reclining position and the passenger is reclining thereon.

It will be understood that other means may be employed for restricting the reclination of the seat back 22 so that it cannot be tilted into the aisle 15 and any suitable means may be employed for that purpose.

In order to permit maximum movement of each seat 16 along its guideways 17 within its particular oblique seating space, I prefer to have the seat back 22 somewhat rounded to correspond to the arcuate shape of the low wall or guard 23, and the aisleward side of said seat back 22 may be beveled to align with the edge of the aisle 15. Thus the seat 16 may be moved inwardly to the edge of the aisle 15 without the back 22 of said seat extending into the aisle 15.

At the outer end of each oblique seat space, an upholstered auxiliary seat 24 is provided underneath the window 13 and so located that when the seat 16 is in its outermost position in the guides 17, in which position the seat back 22 may occupy the reclining position shown in Fig. 3, the auxiliary seat 24 is located at such level directly in front of the seat 16 that it provides a leg and foot supporting continuation thereof. Thus when the seat occupant is stretched out in the reclining position, he is provided with substantially continuous, comfortable, full length support, as indicated in Fig. 3, which affords unusually restful reclining accommodation for overnight travel.

This auxiliary seat 24 may be mounted on the respective car side wall 11 or 12 so that it can be folded flush thereagainst under the window 13 and over the conventional heating pipes 25 as shown in Fig. 2. For this purpose, each auxiliary seat 24 may be provided with pins 26 at the respective sides thereof adjacent the wall and adapted to slide freely in wall slots 27. Folding legs or brackets 28 may be secured at one end to the car side wall 11 or 12 and at the other end to the outer extremity of the auxiliary seat 24 so as to support said auxiliary seat 24 in a horizontal position as shown in Fig. 3.

The folding auxiliary seat arrangement is shown in the seating spaces A, B, C, D, E, F, G, H, and I. However, when the respective seating spaces are permanently partitioned as hereinafter explained, the auxiliary seat may be a boxed-in toilet as indicated at 29 with an upholstered lid 30 corresponding to the auxiliary seat 24.

It is an important feature of my invention that these oblique seating spaces may be individually enclosed and completely separated from one another to provide a separate compartment for each occupant. Such enclosure may be of a temporary nature capable of being disposed of in daytime to provide open coach seats, or the enclosure may be of a permanent nature providing complete enclosure at all times with a retractable closure at the aisle affording individual entrance to or exit from each compartment without disturbing the occupants of adjoining compartments.

For temporary enclosure of the oblique seating spaces for overnight use, curtain facilities 31 may be provided which are suspended from overhead curtain rods or tracks 32 which are mounted on the car ceiling 33 and shaped to correspond to the margins of the oblique seating spaces so that the curtains may be pulled along the respective curtain rods or tracks 32 and extended in a position to enclose the respective seat spaces.

Preferably, the respective seat spaces are separated at the car side wall end by narrow stub partitions 34 disposed between the respective windows 13 and at right angles to the respective car side walls 11 and 12. Each stub partition 34 extends from the floor 10 to a conventional overhead luggage rack 35. On one side, each stub partition 34 is provided with a wash stand 36 of substantially right triangular shape, the hypotenuse portion thereof comprising the front of the wash stand 36 and being substantially aligned with the edge of the corresponding oblique seating space so that the respective seat 16 may be moved up to the window 13 along side the wash stand 36 without interfering therewith. A waste receptacle 37 of substantially the same shape may be provided under the wash stand 36 as shown in Fig. 4 to receive soiled towels, waste paper, and the like.

At a suitable height over each wash stand 36, a shelf 38 may be provided on which clean fabric or paper towels 39 may be stacked for the use of the passenger occupying the contiguous oblique seating space. A mirror 40 may be mounted over the wash stand 36 on the stub partition 34 as shown in Fig. 4. Likewise an electric outlet 41 may be installed in the mullion 14 for the passenger's use in operating an electric shaver or the like.

The overhead luggage rack 35 is of substantially the same dimensions as that in the ordinary passenger coach, but preferably is provided with partitions 42 corresponding substantially to the location of the respective stub partitions 34 and at right angles to the side walls 11 and 12 of the coach so that each passenger has his own overhead luggage compartment. Excess luggage may be stored under the auxiliary seat 24, thus affording space for considerable luggage in each passenger's oblique seating space.

The outer end of each heretofore described curtain 31 adjacent the car side wall 11 or 12 is fastened to the stub partition 34 by means of buttons 43 or the like as shown in Fig. 2. The top edge of each curtain 31 is slidably mounted on the overhead rod or track 32 and each curtain 31 is of such length vertically that it reaches the floor 10 and of such horizontal dimension that when fully extended, it will pass marginally between adjacent oblique seating spaces, around behind the low wall or guard 23 behind the corresponding seat 16, and continues marginally along the aisle 15 to meet and attach to the next corresponding curtain 31, as shown at 31a, in Fig. 1.

For normal daytime use, the curtain 31 would be fully retracted and perhaps draped back over the hook 44 on the opposite side of the stub partition 34 from the wash stand 36. It could be removed from said hook 44 by the passenger on either side of said stub partition 34 when either desired partial or complete privacy. Thus, if a passenger desired to stretch out during the day in semi-privacy but without completely enclosing his space, he could draw the curtains 31 on either or both sides of his oblique seating space outwardly toward the aisle 15 to provide whatever degree of isolation he might desire.

When complete privacy was desired, the passenger could pull the curtain 31 that passes around behind his seat 16 out to its full length. He could pull the curtain 31 on the other side of his seat 16 out far enough to meet it. Thus, if he desired to wash, shave, change clothes, take a midday nap, or retire earlier than the other passengers, he could do so. If desired, the curtains 31 could be operated by means of draw strings such as are commonly used on residential curtain rods to manipulate draperies. Also, each curtain 31 could be supplied with suitably located buttons or snaps so that it could be fastened in closed position to the adjacent curtain 31—thus preventing the passenger on one side from accidentally opening the intervening curtain 31 when his neighbor wanted it closed.

Each oblique seating space is provided with an overhead light 45 and may also have a light over the wash stand 36 if desired. The light 45 and any other lights in the oblique seating space are controlled by a switch 46 or switches located on the mullion 14 as shown. Thus each passenger is able to control the illumination in his own oblique seating space and, by drawing the curtains 31 on each side of his space, he can be independent of the lighting in the adjoining seating spaces.

Normally, when unoccupied, each seat 16 would be backed up against the low arcuate wall or guard 23 with the seat back 22 in upright position as shown in Fig. 2. It is important to note that in said position, owing to the oblique seating arrangement, each seat 16 is accessible from the aisle 15. In other words, when the seat 16 is in upright position at the edge of the aisle 15, the space between the front of such seat 16 and next forward seat 16 or its low arcuate wall or guard 23 is sufficient to permit convenient entry of the passenger into his oblique seating space.

Preferably the respective seats 16 are provided at each side with arms rests 47 and 48, respectively, and in order to further facilitate the passenger's access to his seat, the arm rest 47 on the aisle side may be hinged to fold up out of the way as indicated by the dotted lines in Fig. 2. Normally, however, the arm rest 47 would be kept down for maximum comfort when the passenger is in sitting up position and to keep the passenger within the confines of his oblique seating space when he is in reclining position. The arm rests 47 and 48 would also serve to protect the reclining passenger from encroachment by the passengers in the adjoining spaces.

When a passenger prepares to retire and the adjoining passengers have not already done so, the passenger would remove the respective curtains 31 at each side of his oblique seating space from the respective hooks 44 on the stub partitions 34. He would then draw the curtain 31 nearest his seat 16 outwardly around the low arcuate wall or guard behind his seat 16 and marginally along the aisle 15 as far as it would go. He would then draw the curtain 31 on the opposite side of his oblique seating space outwardly to the aisle 15 where it would pass behind the next adjacent seat 16 and its low arcuate wall or guard 23 and meet the previously extended curtain 31—thus fully enclosing his space.

With his seat 16 in upright, aisleward position, the passenger would have ample space between said seat 16 and the window 13 to enable him to change his clothes, wash up, and the like. When ready to go to bed, the passenger would pull the auxiliary seat 24 out from the wall into horizontal, leg-supporting position. He would then pull the seat 16 forward toward said auxiliary seat 24, place his feet on said auxiliary seat 24 so as to enable pulling the seat 16 all the way forward, and then adjust the seat back 22 into full reclining position. In that position, the passenger could stretch out full length as indicated by the dotted lines in Fig. 3.

It will be understood that the positioning of the seat 16 with respect to the auxiliary seat 24 and the adjustment of the seat back 22 is controlled by the individual passenger thus enabling him to select the position and adjustment affording him maximum comfort.

It will be noted, as shown in Fig. 1, that when a seat 16 as in space B is pulled into full forward position, it is brought into side-by-side relation with the adjoining seat 16 in space C on the aisleward side when the latter is pushed all the way back against the low arcuate wall or guard 23. Thus, as will be understood, when any two adjacent passengers on the same side of the aisle 11 desire to do so, they can pair their seats 16 in side-by-side position so that they may sit beside each other and converse.

Also, in the case of two or more persons traveling together, such as a mother and her children, adjoining spaces could be arranged en suite at night by unfastening the intervening curtains 31 from the stub partition 34 and pushing the intervening portion of such curtains 31 back to the aisle 11, as shown between the oblique seating spaces E and F in Fig. 1.

In a preferred form, the seats 16 would be slightly less than two feet in overall width, including arm rests 47 and 48. Each enclosable oblique seating space would be approximately two feet in width and would extend diagonally from the center aisle 15 to the side wall 11 or 12 forming an acute angle therewith of approximately 35 degrees. This arrangement would require approximately three and one-half feet of space lengthwise both along the aisle 15 and along the side wall 11 or 12.

Coaches presently in use for long distance travel usually have considerable space at each end devoted to men's and women's wash rooms and each of these is provided with several wash stands, a toilet compartment, and space for dressing. My invention would eliminate the need for such space-consuming wash rooms since each passenger would have his own wash stand 36 and enclosable dressing space. A coach so equipped would require two small toilet rooms 50, one for men and one for women, and these could be located at one end of the coach as shown in Fig. 1. This would allow considerably greater space for passenger accommodations than where large dressing rooms are provided. In a standard car 85 feet in length, with a vestibule 49 at at one end only, and with two toilet rooms 50 as indicated in Fig. 1, it would be possible—using the dimensions hereinbefore described—to provide seats 16 and corresponding oblique seating spaces for approximately 42 passengers. The usual modern overnight coach can accommodate 44 passengers, but often times certain of the seats face the rear and are not too desirable. In a coach embodying my invention, all seats 16 would face forward and have the same conveniences. Thus all seats would be equally desirable and the effective seating capacity in a coach embodying my invention would be approximately the same as in the standard overnight coach.

The arrangement which I have shown and described lends itself to many modifications. It requires a minimum of headroom and thus could be adapted quite readily to the requirement of so-called vista dome cars, with their lower ceilings under the dome section. Likewise, by lowering the floor of the car to nearer track level in the space between the trucks, and by raising the height of the roof of the car, as has been done in recently developed commuter coaches, it would be possible to provide accommodations of the type herein described both on an upper deck and on a lower deck, thus increasing the passenger capacity per car. My invention could also be adapted quite readily to the type of trains wherein each of a plurality of trailer coaches is supported at the rear on a pair of spaced wheels and is pivotally mounted at the front end on the rear of the next forward trailer coach.

A particularly advantageous modification of my invention is shown in Fig. 1 in conjunction with seating spaces J, K, and L, wherein permanent partitions 51 are installed between the respective oblique seating spaces instead of the curtains 31. Each partition 51 extends obliquely between the adjoining oblique seating spaces and continues around behind the seat 16 and a short distance along the edge of the aisle 15. Each compartment J, K, and L thus formed by the partitions 51 has its own doorway at the aisle, and said doorway may be closed by means of a vertically split curtain 52. Said curtain 52 may be suspended from the ceiling 33 and fastened along one side to the aisleward end of the partition 51 and along the other side to the back of the next partition 51. When the passenger does not desire full privacy, the respective sides of the split curtain 52 may be fastened back out of the way in any desired manner such as by means of straps or the like. When he wants the curtain 52 closed, he may fasten the respective sides together by means of buttons, snaps, or the like or the respective sides may be closed by means of a slide fastener such as is commonly used on similar split curtains in the doorways of Pullman "roomette" accommodations.

The seats 16 in the compartments thus described would be arranged in the same manner and operate in the same way as those in the open section of the coach shown in Fig. 1 where the seats 16 are enclosable by means of curtains 31. However, as heretofore explained, the auxiliary seat and leg rest would comprise a boxed-in toilet 29 with a hinged upholstered lid 30, thus providing complete facilities in each partitioned compartment J, K, and L.

In an alternative arrangement, the compartment could be provided with an overhead berth (not shown) of substantially the same dimensions as the interior of the partitioned compartment. Thus, after closing the split curtain 52, the passenger could stand in the triangular space between said curtain 52 and the seat 16 while lowering the overhead berth into position on the reclining seat 16, the flexibility of the curtain 52 making it possible for him to stand somewhat in the aisle 15 if necessary while doing so.

While the space thus provided would be relatively narrow for a berth, it will be understood that the spacing could be widened if desired, thus reducing the number of oblique passenger compartments in the car, and the length of the berths could be increased by changing the angle at which the accommodations are disposed in the car. It should be borne in mind, of course, that the herein described accommodations are not intended to offer the utmost in comfort or luxury. Rather, they are designed to afford considerably greater comfort and convenience for coach class passengers without appreciably limiting the capacity of coaches since it is that capacity which makes the economical coach fares possible. Persons desiring greater spaciousness and luxury would continue to use Pullman accommodations.

Recent developments in seating such as the so-called "contour" chairs indicate that a particularly comfortable position for complete, sleep-inducing relaxation is to have the body supported in a relatively flat V-shape. The seats 16 in combination with the auxiliary seats 24 might well embody a modified "contour" chair design. This would appear to have special advantages in coach seats since, by supporting the body in the flattened V-shape, the common tendency of one's body to "slip forward" in the seat owing to the vibration of the train would be counteracted. Moreover in the flattened V-position, the body is not stretched out to its full length and the passenger space required would not be quite as long as where the occupant would lie flat.

While I have shown and described my invention in the preferred forms, it is to be understood, of course, that various modifications can be made in my railroad coach seating facilities employing the principles of my invention without departing from the spirit thereof, the scope of my invention being determined by the accompanying claims.

What is claimed is:

1. A passenger compartment or the like having a side wall with a series of windows therealong, said compartment having therein a series of individual passenger seats along said side wall and facing windowward, each of said seats being adjustable from an upright seating position to a reclining position and movable obliquely toward and away from the side wall along a prescribed path paralleling the path of oblique movement of the next adjoining seat.

2. A passenger compartment or the like having a side wall with a series of windows therealong, said compartment having therein a series of individual passenger seats along said side wall and facing windowward, each of which said seats is individually adjustable from an upright seating position to a reclining position and is individually movable obliquely toward and away from the side wall along a prescribed path paralleling the path of oblique movement of the next adjoining seat, each seat at the extremity of its oblique movement away from the side wall having a space at one side thereof which is unobstructable by any other of said seats and has a passenger entrance therefrom to the front of such seat.

3. A passenger compartment or the like having a side wall with a series of windows therealong, said compartment having therein a corresponding series of individual passenger seats along said side wall, each of which said seats faces toward a separate one of said windows and is adjustable from an upright seating position to a reclining position and is movable obliquely toward and away from the side wall and its respective window along a prescribed path paralleling the path of oblique movement of the next adjoining seat, one of each two adjoining seats being retractable obliquely beyond the fully retracted position of the other of such two adjoining seats to provide a passageway therebetween.

4. A passenger compartment or the like having a side wall with a series of windows therealong, said compartment having therein a series of individual passenger seats along said side wall and facing windowward, each of said seats being adjustable from an upright seating position to a reclining position and movable obliquely toward and away from the side wall along a prescribed path paralleling the path of oblique movement of the next adjoining seat, each two adjoining seats being movable to positions of lateral alignment with one another and one thereof being obliquely retractable rearwardly beyond the other to provide a passageway therebetween.

5. A passenger compartment or the like having a floor with a side wall extending upwardly therefrom and provided with a series of windows therealong at an elevation above the floor, said floor having a corresponding series of laterally parallel runways which are arranged at spaced intervals along the wall and each of which extends obliquely toward the wall at a separate window location, each runway having a seat mounted thereon which is movable obliquely along the runway toward and away from the respective window location and is adjustable from upright seating position to a reclining position.

6. A passenger compartment or the like having a side wall with a series of windows therealong, said compartment having therein a series of individual passenger seats along said side wall and facing windowward, each of said seats being adjustable from an upright seating position to a reclining position and movable obliquely toward and away from the side wall along a prescribed path paralleling the path of oblique movement of the next adjoining seat, and an individual foot rest in front of each seat and to and from which the seat is obliquely movable.

7. A passenger compartment or the like having a floor with a side wall extending upwardly therefrom, a series of adjoining individual elongated parallel compartments extending obliquely inward from the side wall and each having an entrance at the side thereof near the inner end, said side wall having a separate window at the outer end of each said individual compartment, and each compartment having a seat therein which extends from side to side thereof and is adjustable from an upright seating position to a reclining position and is movable lengthwise of the oblique individual compartment along a prescribed path.

8. A passenger compartment or the like having a floor with a side wall extending upwardly therefrom, a series of adjoining individual elongated parallel compartments extending obliquely inward from the side wall and each having an entrance at the side thereof near the inner end, said side wall having a separate window at the outer end of each said individual compartment, and each compartment having a seat therein which extends from side to side thereof and is adjustable from an upright seating position to a reclining position and is movable lengthwise of the oblique individual compartment along a prescribed path, said individual compartments having enclosing walls which are removable.

9. A passenger compartment or the like having a floor with a side wall extending upwardly therefrom, a series of adjoining individual elongated parallel compartments extending obliquely inward from the side wall and each having an entrance at the side thereof near the inner end, said side wall having a separate window at the outer end of each said individual compartment, and each compartment having a seat therein which extends from side to side thereof and is adjustable from an upright seating position to a reclining position and is movable lengthwise of the oblique individual compartment along a prescribed path, said individual compartments being enclosed by curtains which are retractable to the side wall.

10. A passenger compartment or the like having a floor with a side wall extending upwardly therefrom, a series of adjoining individual elongated parallel compartments extending obliquely inward from the side wall and each having an entrance at the side thereof near the inner end, said side wall having a separate window at the outer end of each said individual compartment, and each compartment having a seat therein which extends from side to side thereof and is adjustable from an upright seating position to a reclining position and is movable lengthwise of the oblique individual compartment along a prescribed path, the adjoining individual compartments having curtains therebetween each of which is withdrawable to the side wall.

11. A passenger compartment or the like having a side wall with a series of windows therealong, said compartment having therein a series of individual passenger seats along said side wall and facing windowward, each of said seats being adjustable from an upright seating position to a reclining position and movable obliquely toward and away from the side wall along a prescribed path paralleling the path of oblique movement of the next adjoining seat, the space occupied by each seat having an elongated enclosure of approximately seat width by which it is isolatable from each next adjoining seat space and which extends obliquely inward from said wall to the full distance of retraction of the seat enclosed thereby and has a closable access opening at one side of the outer end leading into the interior of the enclosure, each of the opposite sides of said enclosure comprising a suspended curtain which is retractable to and collapsible in a compact gathering at the side wall.

12. A passenger compartment or the like having a floor with a side wall extending upwardly therefrom, a series of adjoining individual elongated parallel compartments extending obliquely inward from the side wall and each having an entrance at the side thereof near the inner end, said side wall having a separate window at the outer end of each said individual compartment, and each compartment having a seat therein which extends from side to side thereof and is adjustable from an upright seating position to a reclining position and is movable lengthwise of the oblique individual compartment along a prescribed path, said compartments having permanent partitions therebetween and each compartment having a side entranceway thereto at the outer end.

13. In a passenger-carrying vehicle of the class described having a floor, a side wall along each side thereof, and a center aisle therebetween, a chair comprising a seat portion, a back portion reclinable with respect thereto, and a seat mounting, said floor being provided with a guideway interposed obliquely between said center aisle and one of said side walls, said seat mounting being cooperatively engaged with said guideway to permit movement of said chair therealong obliquely toward and away from said side-wall of the vehicle, said side wall being provided with a leg rest adapted to cooperate with said chair so that when the latter is in a position adjacent the leg rest and the back portion of the seat is in reclining position, a substantially full length, horizontal body support is provided.

14. In a passenger vehicle of the class described having a floor, a sidewall along one side of said floor, and an aisle on said floor spaced from and substantially parallel with said sidewall, a plurality of passenger seating compartments, each of said compartments being disposed substantially obliquely between the sidewall and the aisle, respectively, and having a partition at each side thereof extending obliquely from adjacent the aisle toward the sidewall, and each of said compartments having a seat therein adapted to be moved along an oblique path between said partitions from a position adjacent the aisle to a position near the sidewall.

EUGENE MANNING GILES.

REFERENCES CITED

The following references are of record in the file of this patent:

UNITED STATES PATENTS

| Number | Name | Date |
|---|---|---|
| 672,864 | Strauss | Apr. 23, 1901 |
| 1,889,274 | Dahms | Nov. 29, 1932 |
| 2,229,608 | Ragsdale et al. | Jan. 21, 1941 |